US012689507B2

(12) United States Patent
Jeong et al.

(10) Patent No.: US 12,689,507 B2
(45) Date of Patent: Jul. 21, 2026

(54) STORAGE DEVICE AND OPERATING METHOD THEREOF

(71) Applicant: Samsung Electronics Co., Ltd., Suwon-si (KR)

(72) Inventors: Jiman Jeong, Suwon-si (KR); Yongmin Kim, Suwon-si (KR); Yunho Youm, Suwon-si (KR); Seungho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 18/357,384

(22) Filed: Jul. 24, 2023

(65) Prior Publication Data

US 2024/0235829 A1 Jul. 11, 2024

(30) Foreign Application Priority Data

Jan. 5, 2023 (KR) ........................ 10-2023-0001915

(51) Int. Cl.
| | |
|---|---|
| *H04L 9/08* | (2006.01) |
| *G06F 21/60* | (2013.01) |
| *H04L 9/14* | (2006.01) |
| *H04L 9/30* | (2006.01) |
| *H04L 9/40* | (2022.01) |
| *G06F 21/62* | (2013.01) |

(52) U.S. Cl.
CPC .......... *H04L 9/0894* (2013.01); *G06F 21/602* (2013.01); *H04L 9/0822* (2013.01); *H04L 9/0825* (2013.01); *H04L 9/0869* (2013.01); *H04L 9/088* (2013.01); *H04L 9/14* (2013.01);

*H04L 9/30* (2013.01); *H04L 63/0428* (2013.01); *G06F 21/6209* (2013.01); *H04L 63/045* (2013.01); *H04L 2209/84* (2013.01)

(58) Field of Classification Search
CPC ....... H04L 2209/84; H04L 9/08; H04L 9/088; H04L 9/0869; H04L 9/0822; H04L 9/0894; H04L 9/0825; H04L 9/14; H04L 9/30; H04L 63/04; H04L 63/045; H04L 63/0428; H04L 63/0442; H04L 63/0478; G06F 21/602; G06F 21/60; G06F 21/6209

See application file for complete search history.

(56) References Cited

U.S. PATENT DOCUMENTS

| | | | |
|---|---|---|---|
| 10,348,694 B2 | 7/2019 | Cho et al. |
| 10,991,175 B2 | 4/2021 | Zhang et al. |
| 11,290,437 B2 | 3/2022 | Zhang et al. |

(Continued)

FOREIGN PATENT DOCUMENTS

| | | |
|---|---|---|
| KR | 10-1046907 B1 | 7/2011 |
| KR | 10-1838511 B1 | 3/2018 |
| KR | 10-2236235 B1 | 4/2021 |

*Primary Examiner* — Shaqueal D Wade-Wright
(74) *Attorney, Agent, or Firm* — Wolf, Greenfield & Sacks, P.C.

(57) ABSTRACT

A storage device inventive concepts includes a controller configured to receive data and generate a first encryption key; and a memory storing a second encryption key, wherein the controller may be further configured to encrypt the data with the first encryption key, encrypt the first encryption key with the second encryption key, and store the encrypted data and the encrypted first encryption key in the memory.

13 Claims, 9 Drawing Sheets

(56) References Cited

U.S. PATENT DOCUMENTS

| | | | | |
|---|---|---|---|---|
| 2005/0071052 A1* | 3/2005 | Coletrane | .............. | G07C 5/008 |
| | | | | 701/1 |
| 2015/0334113 A1* | 11/2015 | Angus | .................. | H04L 63/126 |
| | | | | 713/168 |
| 2016/0323741 A1* | 11/2016 | Lee | ....................... | H04W 12/06 |
| 2016/0330180 A1* | 11/2016 | Egorov | ................... | G09C 1/00 |
| 2018/0254901 A1* | 9/2018 | Egorov | ................ | H04L 9/0822 |
| 2021/0167956 A1* | 6/2021 | Stöttinger | ............. | H04L 9/0897 |
| 2021/0367930 A1* | 11/2021 | Wang | .................... | H04L 9/3268 |
| 2022/0315240 A1* | 10/2022 | Kubisiak | ................ | B64U 70/40 |
| 2023/0153022 A1* | 5/2023 | Lee | ....................... | G06F 3/0679 |
| | | | | 711/154 |
| 2023/0318823 A1* | 10/2023 | Geng | ................... | H04L 63/068 |
| | | | | 701/32.6 |

* cited by examiner

FIG. 2

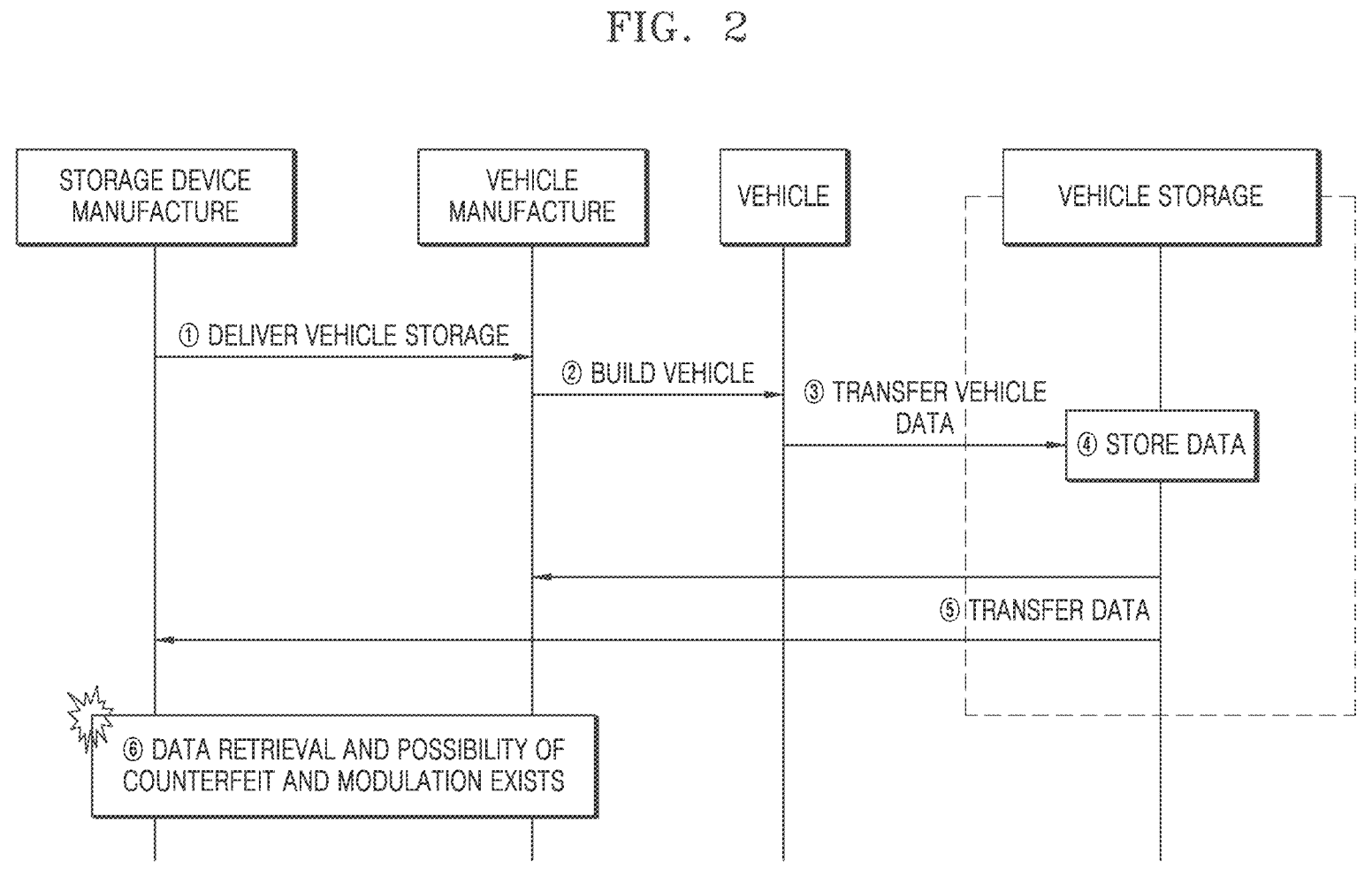

STORAGE DEVICE MANUFACTURE

VEHICLE MANUFACTURE

VEHICLE

VEHICLE STORAGE

① DELIVER VEHICLE STORAGE

② BUILD VEHICLE

③ TRANSFER VEHICLE DATA

④ STORE DATA

⑤ TRANSFER DATA

⑥ DATA RETRIEVAL AND POSSIBILITY OF COUNTERFEIT AND MODULATION EXISTS

FIG. 9

STORAGE DEVICE AND OPERATING METHOD THEREOF

CROSS-REFERENCE TO RELATED APPLICATION

This application is based on and claims priority under 35 U.S.C. § 119 to Korean Patent Application No. 10-2023-0001915, filed on Jan. 5, 2023, in the Korean Intellectual Property Office, the disclosure of which is incorporated by reference herein in its entirety.

BACKGROUND

The inventive concepts relate to electronic devices, and more particularly, to storages device and operating methods thereof.

An autonomous driving system (or advanced driver assistance system (ADAS)) acquires information about a host vehicle and a surrounding environment from various types of sensors, and controls a vehicle on the basis of the acquired information, thereby performing safe driving.

Recently, the use of autonomous driving technology is increasing, but it is difficult to determine whether an accident has occurred during autonomous driving. Thus, it is important to prove that data related to the vehicle (e.g., the angle of a handle steering device, whether a brake operation is being performed, whether an accelerator is activated, the speed of the vehicle, etc.) has not been counterfeited or modulated by a user, a storage device manufacturer, a vehicle manufacturer, or the like. Accordingly, there is an increasing need for a technology capable of preventing vehicle-related data from being forged or modulated by the user, the storage device manufacturer, and the vehicle manufacturer, or the like.

SUMMARY

Some example embodiments of the inventive concepts provide a storage device and/or an operating method thereof.

The objective for which the technical idea of the inventive concepts are to be solved is not limited to the above-mentioned tasks, and other objectives may be clearly understood from the following description to those of ordinary skill in the art.

According to some example embodiments, a storage device may include a controller configured to receive data and generate a first encryption key, and a memory storing a second encryption key, wherein the controller may be further configured to encrypt the data with the first encryption key, encrypt the first encryption key with the second encryption key and store the encrypted data and the encrypted first encryption key in the memory.

According to some example embodiments, a method may include receiving vehicle data including at least one of an angle of a steering device of a vehicle, a speed of the vehicle, an indication of whether or not an accelerator of the vehicle is activated, or an indication of whether or not a brake of the vehicle is activated, generating a first encryption key, encrypting the vehicle data with a first encryption key, encrypting the first encryption key with a second encryption key, and storing the encrypted vehicle data and the encrypted first encryption data in a memory.

According to some example embodiments, a method of encrypting and decrypting vehicle data may include encrypting the vehicle data based on a first key, encrypting the first key, based on a second key, decrypting the encrypted first key, and decrypting the encrypted vehicle data based on the decrypted first key.

BRIEF DESCRIPTION OF THE DRAWINGS

Example embodiments will be more clearly understood from the following detailed description taken in conjunction with the accompanying drawings in which:

FIG. 2 is a view for describing a system according to a comparative example according to some example embodiments;

FIG. 9 is a block diagram illustrating a system according to some example embodiments.

DETAILED DESCRIPTION

Figure 1:
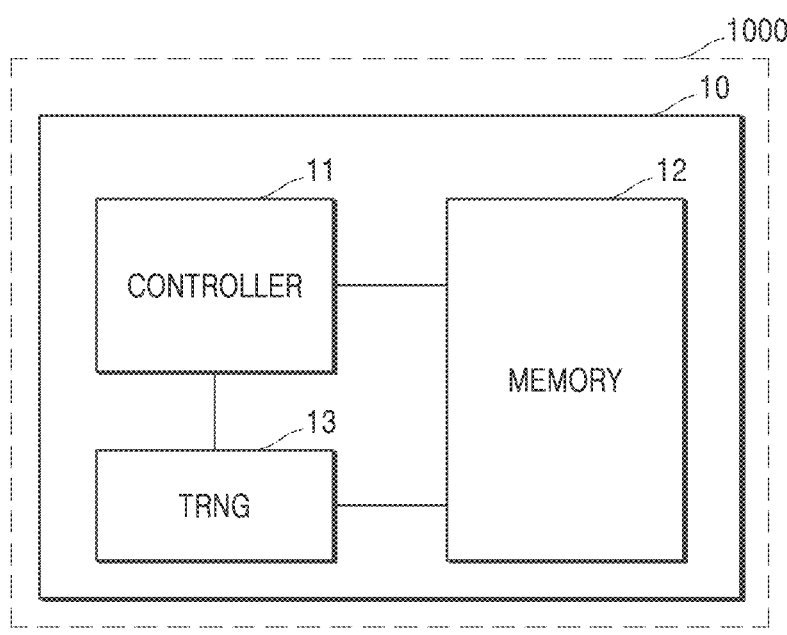
FIG. 1 is a block diagram illustrating a storage device according to some example embodiments.

Hereinafter, some example embodiments of the inventive concepts will be described in detail with reference to the accompanying drawings. Some example embodiments of the inventive concepts are provided to more completely explain the inventive concepts to a person having an average knowledge in the art. Since various modifications and various example embodiments of the inventive concepts are possible, some specific example embodiments are illustrated in the drawings and described in detail. However, the inventive concepts are not limited to the example embodiments disclosed herein, and it should be understood that the inventive concepts include all changes, equivalents, and replacements included in the spirit and technical scope of the inventive concepts. While describing each drawing, similar reference numerals are used for similar components. In the accompanying drawings, the dimensions of the structures are shown by enlarging or reducing the size of the structure in order to avoid clarity of the inventive concepts.

The terms used in the present application are used to describe specific example embodiments only, and are not intended to limit the inventive concepts. The expression of the singular includes a plurality of representations, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

In addition, the terms first, second, etc. may be used to describe various elements, but the elements should not be limited by the terms. The terms can be used for the purpose of distinguishing one component from another component. For example, a first element could be termed a second element, and, similarly, a second element could be termed a first element, without departing from the scope of the inventive concepts.

Unless otherwise defined, all terms used herein, including technical or scientific terms, have the same meaning as commonly understood by one of ordinary skill in the art to which the inventive concepts pertain. Such terms as those defined in commonly used dictionaries should be interpreted as having a meaning that is consistent with their meaning in the context of the relevant art, and are not to be interpreted in an idealized or overly formal sense unless expressly so defined herein.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

FIG. 1 is a block diagram illustrating a storage device according to some example embodiments.

Referring to FIG. 1, a storage device 10 according to some example embodiments may include a controller 11, a memory 12 and/or a True Random Number Generator (TRNG) 13, which may be communicatively coupled to each other as shown in FIG. 1. The storage device 10 may be a vehicle storage device included in a vehicle 1000, but example embodiments are not limited thereto. The storage device 10 may be configured to encrypt and store data related to the vehicle 1000, for example.

The controller 11 may be configured to perform operations or data processing related to control and/or communication of other components included in the storage device 10. For example, the controller 11 may be configured to receive data. Although not shown, the controller 11 may include a buffer, and the controller 11 may receive data using a buffer. For example, the controller 11 may be configured to receive data related to the vehicle 1000. The data related to the vehicle 1000 may be black box data of the vehicle 1000, and may include data indicating an angle of a handle steering device of the vehicle 1000, data indicating whether or not a brake of the vehicle 1000 is activated, data indicating whether or not an accelerator of the vehicle 1000 is activated, data indicating a speed of the vehicle 1000, or the like.

The controller 11 may be configured to generate a first encryption key. In this case, the controller 11 may be configured to generate the first encryption key by using the TRNG 13.

The controller 11 may be configured to encrypt received data with the generated first encryption key. For example, the controller 11 may generate a symmetric key with the first encryption key, and may be configured to encrypt data with the generated symmetric key. The controller 11 may encrypt the data with the symmetric key, thereby encrypting data at a higher speed than when data is encrypted with a public key or the like.

The controller 11 may be configured to encrypt the first encryption key with a second encryption key to generate an encrypted first encryption key. The generated first encryption key that has not been encrypted with the second encryption key may be referred to as an unencrypted first encryption key. The storage device 10 may retain a copy of the unencrypted first encryption key upon generating the encrypted first encryption key. The operation of the controller 11 will be described in more detail below.

The memory 12 may include a volatile and/or a nonvolatile memory. The memory 12 may store instructions or data related to at least one another component in a system, for example. According to some example embodiments, the memory 12 may be configured to store an encryption key, an encrypted encryption key and/or encrypted data.

The TRNG 13 may be a random number generator and may be configured to generate the encryption key (e.g., the first encryption key, which may be referred to as generated as an unencrypted first encryption key). Specifically, as described above, the controller 11 may be configured to generate the encryption key by using the TRNG 13.

More specific operations related to encryption key generation, data encryption, and encryption key encryption by the controller 11 will be described below.

FIG. 2 is a view for describing a system according to a comparative example according to some example embodiments.

Referring to FIG. 2, a storage device manufacturer may manufacture a storage device to deliver a storage device to a vehicle manufacturer (①). Also, the vehicle manufacturer may build the vehicle so that the purchased storage device may be included in the vehicle ((②)).

The vehicle may be configured to transfer pieces of data related to the vehicle generated through driving, parking or the like of the vehicle to the above-described storage device (i.e., the vehicle storage device). For example, pieces of data related to the vehicle may include data indicating one or more of an angle of a handle steering device of the vehicle, whether or not a brake of the vehicle is activated, whether or not an accelerator of the vehicle is activated, a speed of the vehicle, or the like. The vehicle storage device may be configured to store pieces of data related to the vehicle received from the vehicle ((④)).

For reasons such as vehicle collision occurring (e.g., in response to a determination that a vehicle that includes the vehicle storage device has collided with an object), the vehicle manufacturer and/or the storage device manufacturer may make a request (e.g., transmit a request to the vehicle storage device, the vehicle that includes the vehicle storage device, or the like) to retrieve data related to the vehicle. Thus, vehicle-related data may be transferred (e.g., transmitted) from the vehicle storage device to the vehicle manufacturer and/or the storage device manufacturer ((⑤)), and the vehicle manufacturer and/or the storage device manufacturer may collect or check vehicle-related data. The vehicle manufacturer and/or the storage device manufacturer may maliciously counterfeit or modulate the vehicle before providing the vehicle-related data to the user in order to hide a defect or the like of the device, and thus the integrity (e.g., the security) of the data may not be secured ((⑥)).

The storage device according to some example embodiments may encrypt data received from one or more vehicle systems of the vehicle with the first encryption key, may encrypt the first encryption key (e.g., encrypted the unencrypted first encryption key) with the second encryption key and may store the encrypted data and the encrypted first encryption key. Thus, when a request for data transmission occurs (e.g., in response to receiving a request from an external device for transmission of data stored at the storage device to one or more external devices, which may be the same or different as the external device from which the request is received and which may be an external device supporting an entity which generated the second encryption key), the storage device may transfer (e.g., transmit) the encrypted data and the encrypted first encryption key (e.g., to one or more external devices indicated by the request), thereby reducing or preventing counterfeiting and modulation of data and securing the integrity of the data, thereby improving reliability of ascertaining operation of and/or events involving the vehicle that includes the storage device and thereby improving the reliability (e.g., integrity, security, confidence of accuracy, etc.) of monitoring of vehicle operations, based on reducing the risk that the stored data used to monitor the vehicle operations and/or events has been counterfeited and/or modulated by a third party (e.g., the vehicle manufacturer, the storage device manufacturer, or the like). As a result, for example, when a vehicle is involved in a collision, and the encrypted data and encrypted first encryption key stored in a vehicle storage device of the vehicle is requested (where the encrypted data may at least partially comprise vehicle black box data indicating one or more aspects of operation of the vehicle at or near the time of the collision), the storage and transfer of the encrypted data and encrypted first encryption key to an external device to be decrypted (where, for example the first encryption key is encrypted with a second encryption key which may be a public key corresponding to a private key accessible at the external device for the description) may result in improved confidence in the accuracy of the one or more aspects of operation of the vehicle as indicated by the encrypted data once decrypted and processed, thereby enabling improved confidence in determining the causes of the collision and sources of one or more faults causing the collision. In addition, because the data may be encrypted using a symmetric key, the data (which may be larger in size than the symmetric key) may be encrypted more quickly, thereby improving operational speed and reducing power consumption (due to reduced operational requirements and operation time to encrypt the data) without compromising data security, due to further encrypting the symmetric key with a public key. In some example embodiments the encrypted data and encrypted first encryption key may be transferred to an external device that excludes the storage device manufacturer and excludes the vehicle manufacturer (e.g., an external device supporting an authorized institution that generated the second encryption key), which may further improve confidence that the encrypted data has not been counterfeited or modulated or otherwise tampered with by the storage device manufacturer or the vehicle manufacturer. A more detailed operation of the storage device according to some example embodiments will be described below.

Figure 3:
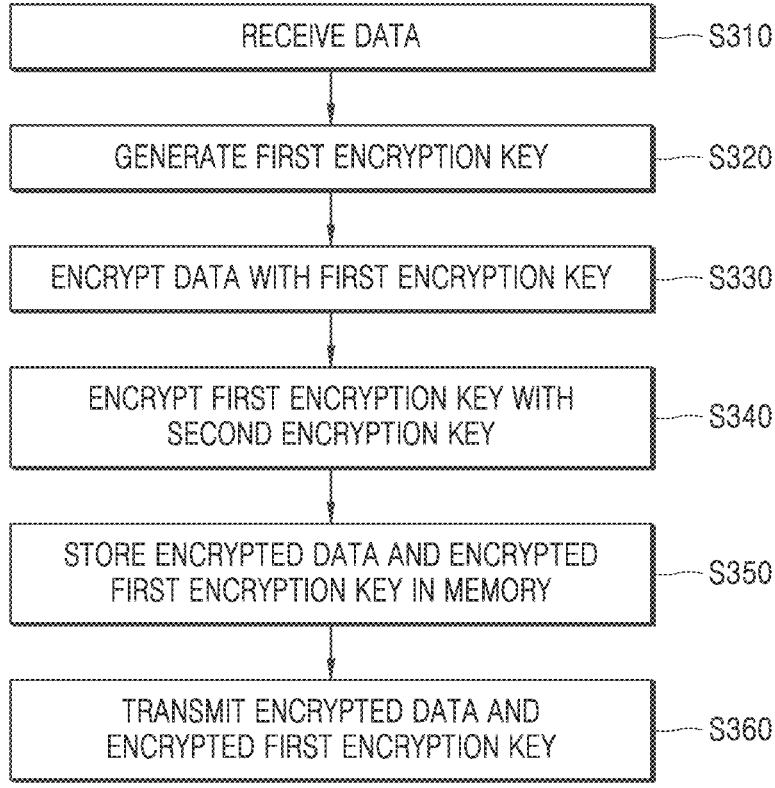
FIG. 3 is a flowchart illustrating a method according to some example embodiments.

FIG. 3 is a flowchart illustrating a method according to some example embodiments. Hereinafter, FIG. 3 will be described with reference to FIG. 1.

Referring to FIGS. 1 and 3, in a method according to some example embodiments, in operation S310, the controller 11 may receive data. Specifically, the controller 11 may be configured to receive vehicle-related data. The data related to the vehicle may be black box data of the vehicle, and may include data indicating an angle of a handle steering device of the vehicle, data indicating whether or not a brake of the vehicle is activated, data indicating whether or not an accelerator of the vehicle is activated, data indicating a speed of the vehicle, or the like.

In operation S320, the controller 11 may generate a first encryption key so as to encrypt the received data. In this case, the controller 11 may be configured to generate the first encryption key by using the TRNG 13. For example, the controller 11 may be configured to generate a symmetric key as the first encryption key. The first encryption key as generated at S320 may be referred to as a generated first encryption key, an unencrypted first encryption key, or the like.

In operation S330, the controller 11 may encrypt the received data with the generated first encryption key. The controller 11 may encrypt the received data with the generated first encryption key so that the security level of data may be increased. For example, the controller 11 may encrypt the data with the symmetric key so that the security of data may be maintained or improved, and may encrypt the data at a higher speed than when the data is encrypted with a public key or the like. Based on encrypting the data with a symmetric key, which may encrypt the data at a higher speed than when the data is encrypted with a public key or the like, the operational performance of the storage device at rapidly and efficiently encrypting vehicle related data may be increased, and the power consumption of the storage device 10 to perform the encryption may be reduced due to performing the encryption more quickly based on using a symmetric key.

In operation S340, the controller 11 may encrypt the first encryption key with the second encryption key. Specifically, the controller 11 may be configured to encrypt the first encryption key with the second encryption key stored in the memory 12. The second encryption key may be previously stored during manufacturing of the memory 12 (e.g., stored at the memory 12 as manufacturer-embedded software), such that the second encryption key may be stored at the memory 12 prior to the storage device 10 being incorporated into a vehicle being built, such that the storage device is configured to store the second encryption key at the memory 12 prior to the receipt of data at operation S310 and the generation of the first encryption key at S320, and the controller 11 may encrypt the first encryption key with the second encryption key that is previously stored during manufacturing of the memory 12. Since the vehicle is built while the second encryption key is previously stored in the memory 12 during manufacturing of the memory 12, security (e.g., security of data that is encrypted using the second encryption key) may be further reinforced (e.g., improved). Also, the second encryption key may be a public key (e.g., a public key of a key pair that includes the public key and a corresponding private key), for example. The public key may be a public key issued from authorized institutions. The public key issued from the authorized institutions may be stored in the memory 12, and the first encryption key may be encrypted with the public key so that security (e.g., security of the first encryption key and data that is encrypted using the first encryption key, and thus reliability of the data that is encrypted using the first encryption key) may be further reinforced. In addition, because the received data may be encrypted using a first encryption key (e.g., symmetric key) in operation S330, the received data (which may be larger in size than the first encryption key) may be encrypted more quickly, thereby improving operational speed and reducing power consumption (due to reduced operational requirements and operation time to encrypt the received data) without compromising data security, due to further encrypting the first encryption key with a second encryption key (e.g., public key) to thereby improve security of the encrypted data.

In operation S350, the controller 11 may store the encrypted data and the encrypted first encryption key in the memory 12. In this case, the controller 11 may store a pair of encrypted data and an encrypted first encryption key in the memory 12. For example, the controller 11 may store information indicating that the encrypted data and the encrypted first encryption key are associated with each other, in the memory 12. Thus, when the data is transferred to the outside (e.g., transmitted to an external device), the encrypted data and the encrypted first encryption key may be transferred in a pair. In addition, a separate matching table (for example, a table related to a logic page number (LPN)) that stores the encrypted data and the encrypted first encryption key is operated so that the encrypted data and the location where the encrypted first encryption key is stored may be easily identified. Thus, when data is transferred to the outside, the encrypted data and the encrypted first encryption key may be transferred in a pair.

Figure 9:
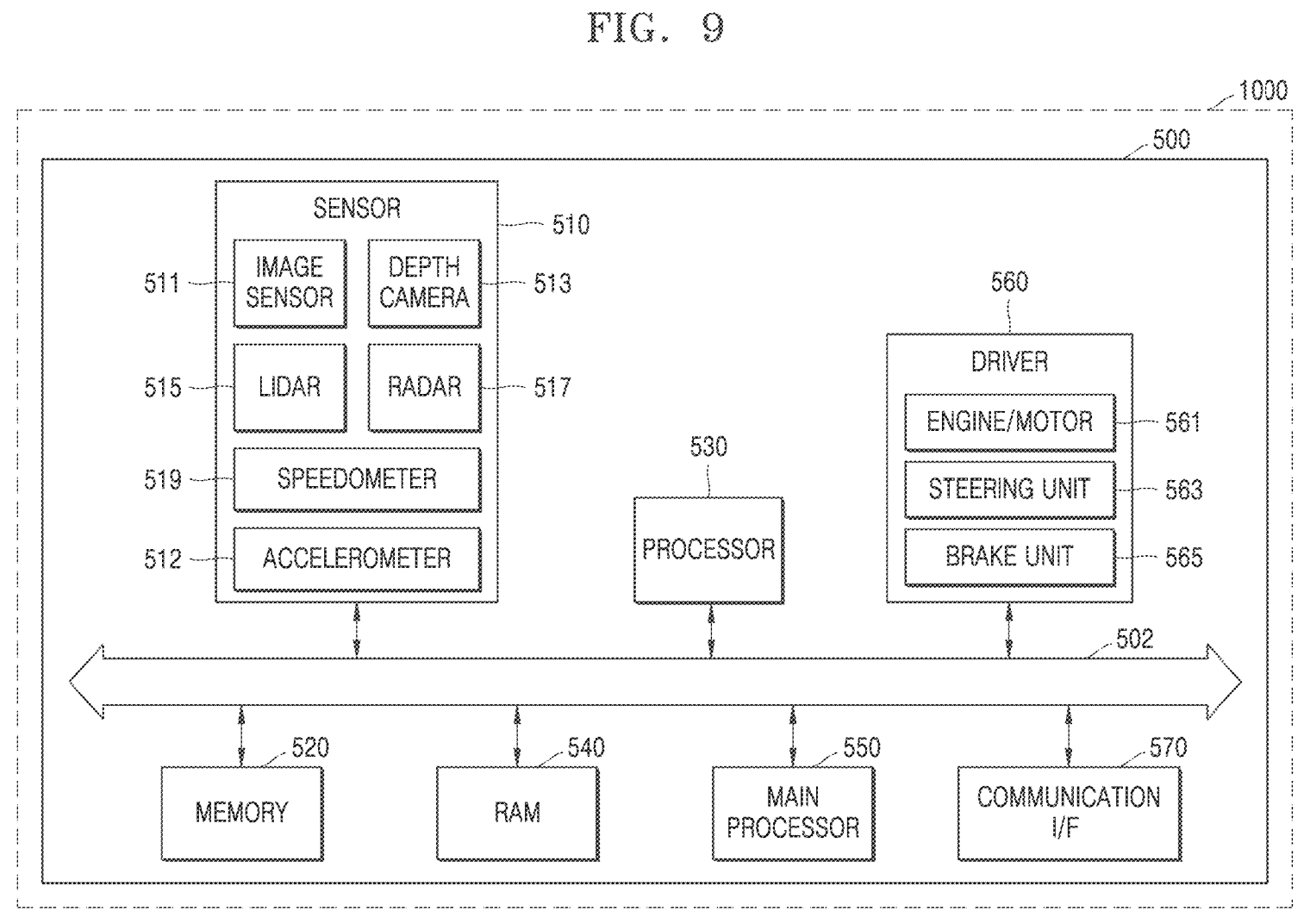

In operation S360, the encrypted data and the encrypted first encryption key may be transmitted (e.g., transferred) to an external device in response to receiving (e.g., at the storage device 10 via a communication interface thereof such as corresponding to communication interface 570 shown in FIG. 9) a request for the data. The encrypted data and the encrypted first encryption key may be transmitted (e.g., transferred) to the same external device from which the request is received and/or to a separate external device indicated in the received request. Based on the encrypted data and the encrypted first encryption key that is encrypted using the second encryption key being transmitted as a pair, such that the encrypted data may be decrypted based on using an encryption key (e.g., a private key corresponding to second encryption key) to decrypt the encrypted first encryption key and further using the decrypted first encryption key to decrypt the encrypted data for example as described with reference to FIG. 7, the security of the decrypted data may be improved.

In some example embodiments, the encrypted data and encrypted first encryption key may be transferred in operation S360 to an external device that supports (e.g., is operated by) an authorized institution that generated the second encryption key and which may possess a private key corresponding to a public key that is the second encryption key, so that the external device may be configured to implement decryption of the encrypted first encryption key using the private key and subsequently decrypt the encrypted data using the decrypted first encryption key, which may further improve confidence that the encrypted data, once decrypted, has not been counterfeited or modulated or otherwise tampered with (e.g., by the storage device manufacturer or the vehicle manufacturer). It will be understood that operation S360 may be included in any of the methods described herein, for example as an operation following any of operations S460 shown in FIG. 4, operation S560 shown in FIG. 5, or the like.

Figure 4:
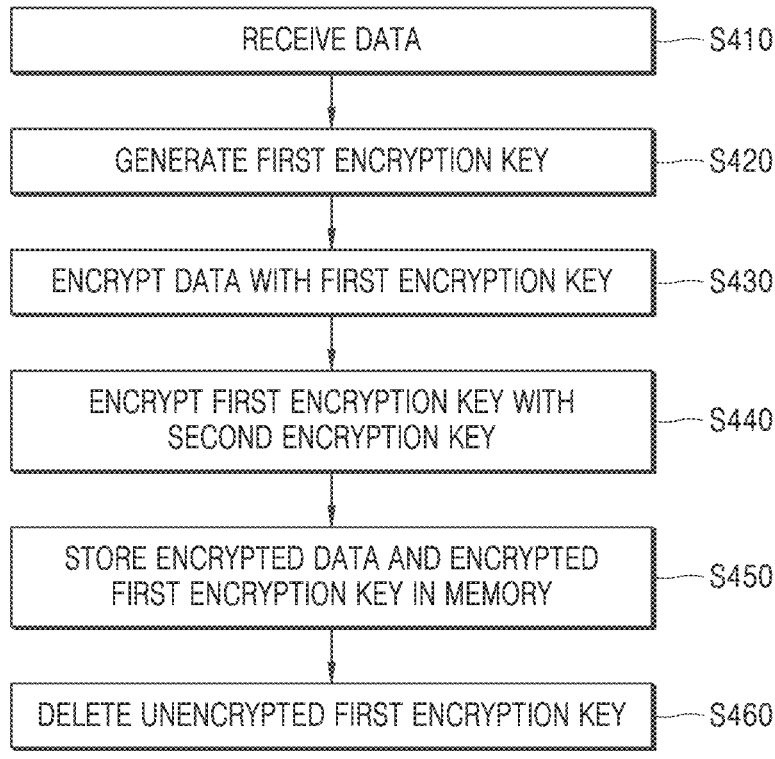
FIG. 4 is a flowchart illustrating a method according to some example embodiments.

FIG. 4 is a flowchart illustrating a method according to some example embodiments. Hereinafter, FIG. 4 will be described with reference to FIG. 1.

Referring to FIGS. 1 and 4, in the method according to some example embodiments, in operation S410, the controller 11 may receive data. Specifically, the controller 11 may be configured to receive vehicle-related data. The data related to the vehicle may be black box data of the vehicle, and may include an angle of a handle steering device, whether or not a brake is activated, whether or not an accelerator is activated, a speed of the vehicle, and the like.

In operation S420, the controller 11 may generate a first encryption key so as to encrypt the received data. In this case, the controller 11 may be configured to generate the first encryption key by using the TRNG 13. For example, the controller 11 may be configured to generate a symmetric key as the first encryption key.

In operation S430, the controller 11 may encrypt the received data with the generated first encryption key. The controller 11 may encrypt the received data with the generated first encryption key so that the security level of data may be increased. For example, the controller 11 may encrypt the data with the symmetric key so that the security of data may be maintained, and may encrypt the data at a higher speed than when the data is encrypted with a public key or the like.

In operation S440, the controller 11 may encrypt the first encryption key with a second encryption key. In this case, the controller 11 may be configured to encrypt the first encryption key with the second encryption key stored in the memory 12. Specifically, the second encryption key may be previously stored during manufacturing of the memory 12, and the controller 11 may encrypt the first encryption key with the second encryption key that is previously stored during manufacturing of the memory 12. Since the vehicle is built while the second encryption key is stored in the memory 12 during manufacturing of the memory 12, security may be further reinforced. Also, the second encryption key may be a public key, for example. The public key may be a public key issued from authorized institutions. The public key Issued from the authorized institutions may be stored in the memory 12, and the first encryption key may be encrypted with the public key so that security may be further reinforced.

In operation S450, the controller 11 may store the encrypted data and the encrypted first encryption key in the memory 12. In this case, the controller 11 may store a pair of encrypted data and an encrypted first encryption key in the memory 12. For example, the controller 11 may store information indicating that the encrypted data and the encrypted first encryption key are associated with each other, in the memory 12. Thus, when the data is transferred to the outside, the encrypted data and the encrypted first encryption key may be transferred in a pair. In addition, a separate matching table (for example, a table related to an LPN) for a location in which the encrypted data and the encrypted first encryption key are stored may be operated so that encrypted data and a location in which the encrypted first encryption key is stored may be easily identified. Thus, when data is transferred to the outside, the encrypted data and the encrypted first encryption key may be transferred in a pair.

In operation S460, the controller 11 may delete the first encryption key that was used to encrypt the data at operation S430 (e.g., delete the unencrypted first encryption key). For example, the controller 11 may be configured to delete the first encryption key when (e.g., in response to a determination that) the encrypted data and the encrypted first encryption key are stored in the memory 12 (e.g., in response to a determination that operation S450 is complete). The first encryption key (e.g., unencrypted first encryption key) that was used once to encrypt the data may be deleted so that the storage device 10 may increase the security level associated with the encrypted data. For data (e.g., additional data) received after deletion of the first encryption key, the controller 11 may be configured to generate a third encryption key to encrypt the data. A detailed content of generating of a third encryption key will be described below.

Also, the controller 11 may be configured to delete an encryption key for encrypting data whenever a certain time has elapsed (e.g., in response to a determination that a certain period of time has elapsed since the encryption key was generated, in response to a determination that a certain period of time has elapsed since the encryption key was used to encrypt at least one piece of data, in response to a determination that a certain clock time has occurred, etc.). In other words, the controller 11 may delete the encryption key for encrypting data at a certain period. The controller 11 may periodically delete the encryption key for encrypting data and may encrypt data by generating a new encryption key so that the security level of the storage device 10 (also referred to as the security of data encrypted and stored at the storage device 10) may be increased.

Also, the controller 11 may delete the encryption key for encrypting data whenever power (e.g., a supply of power received at the storage device 10 from a power supply device) is turned on or off. The controller 11 may delete an encryption key for encrypting data whenever power is turned on or off, and may generate a new encryption key to encrypt the data, so that the security level of the storage device 10 may be increased.

Although not shown in the drawings, the controller 11 may be set not to delete the stored data in response to external instructions. For example, when receiving the instructions to delete the data stored in the memory 12, the controller 11 may be configured not to delete the data. For example, the controller 11 may be configured to refrain from deleting data stored in the memory 12 even in response to receiving instructions to delete such data. Restated, the controller 11 may be configured to ignore or refuse to implement received instructions to delete data stored in the memory 12. In addition, according to the capacity operation plan of the memory 12, the controller 11 may sequentially delete data from which a certain time has elapsed (e.g., sequentially delete encrypted data, encrypted first encryption keys, etc. in response to a determination that a certain period of time has elapsed since such data and/or keys was encrypted and/or stored in the memory 12), but the controller 11 may prevent data from being deleted by inputting external instructions. By preventing the controller 11 from deleting data by the external instructions, the storage device 10 may prevent counterfeiting or modulation of the stored data.

Figure 5:
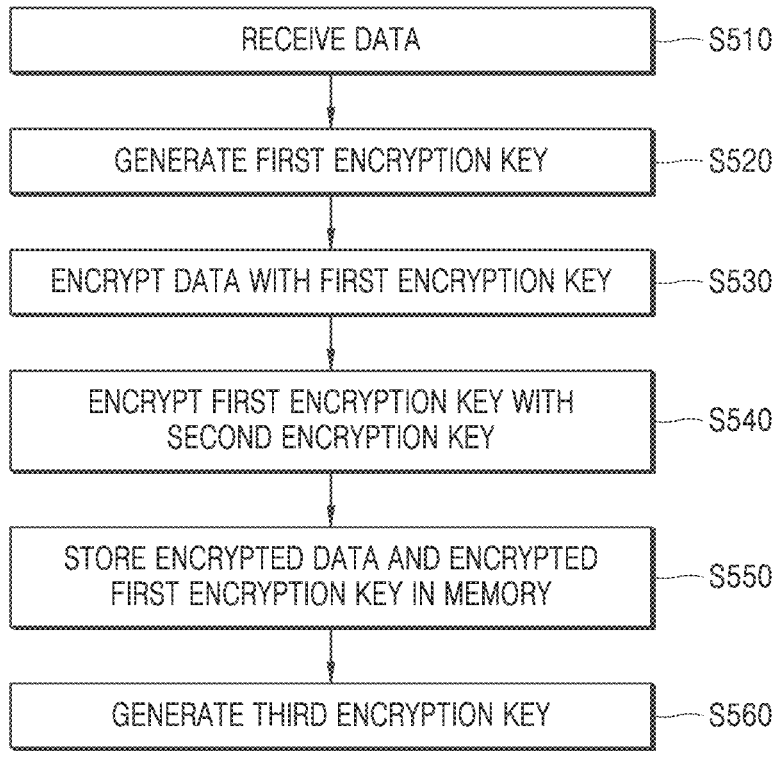
FIG. 5 is a flowchart illustrating a method according to some example embodiments.

FIG. 5 is a flowchart illustrating a method according to some example embodiments. Hereinafter, FIG. 5 will be described with reference to FIG. 1.

Referring to FIGS. 1 and 5, in the method according to some example embodiments, in operation S510, the controller 11 may receive data. Specifically, the controller 11 may be configured to receive vehicle-related data. The data related to the vehicle may be black box data of the vehicle, and may include an angle of a handle steering device, whether or not a brake is activated, whether or not an accelerator is activated, a speed of the vehicle, and the like.

In operation S520, the controller 11 may generate a first encryption key so as to encrypt the received data. In this case, the controller 11 may be configured to generate the first encryption key by using the TRNG 13. For example, the controller 11 may be configured to generate a symmetric key as the first encryption key.

In operation S530, the controller 11 may encrypt the received data with the generated first encryption key. The controller 11 may encrypt the received data with the generated first encryption key so that the security level of data may be increased. For example, the controller 11 may encrypt the data with the symmetric key so that the security of data may be maintained, and may encrypt data at a higher speed than when the data is encrypted with a public key or the like.

In operation S540, the controller 11 may encrypt the first encryption key with a second encryption key. In this case, the controller 11 may be configured to encrypt the first encryption key with the second encryption key stored in the memory 12. Specifically, the second encryption key may be previously stored during manufacturing of the memory 12, and the controller 11 may encrypt the first encryption key with the second encryption key that is previously stored during manufacturing of the memory 12. Since the vehicle is built while the second encryption key is stored in the memory 12 during manufacturing of the memory 12, security may be further reinforced. Also, the second encryption key may be a public key, for example. The public key may be a public key issued from authorized institutions. The public key issued from the authorized institutions may be stored in the memory 12, and the first encryption key may be encrypted with the public key so that security may be further reinforced.

In operation S550, the controller 11 may store the encrypted data and the encrypted first encryption key in the memory 12. In this case, the controller 11 may store a pair of encrypted data and an encrypted first encryption key in the memory 12. For example, the controller 11 may store information indicating that the encrypted data and the encrypted first encryption key are associated with each other, in the memory 12. Thus, when the data is transferred to the outside, the encrypted data and the encrypted first encryption key may be transferred in a pair. In addition, a separate matching table (for example, a table related to an LPN) for a location in which the encrypted data and the encrypted first encryption key are stored may be operated so that encrypted data and a location in which the encrypted first encryption key is stored may be easily identified. Thus, when data is transferred to the outside, the encrypted data and the encrypted first encryption key may be transferred in a pair.

In operation S560, the controller 11 may be configured to generate a third encryption key. Specifically, the controller 11 may generate the third encryption key that is a new encryption key for encrypting data, thereby encrypting data using the third encryption key instead of an existing first encryption key. For example, the controller 11 may be configured to generate a third encryption key when (e.g., in response to a determination that) an impact occurs in an electronic device (for example, a vehicle) including the storage device 10 (e.g., in response to a determination that the electronic device has impacted, collided, etc. with an external object in an external environment), encrypt data received at the storage device 10 with the third encryption key, and encrypt the third encryption key with the second encryption key. When collision occurs in a vehicle including the storage device 10, an inquiry request for data stored from a user, a vehicle manufacturer, and the like may be generated, and the stored encrypted data and the encrypted encryption key may be transferred to the outside. When vehicle collision and an impact occur (e.g., in response to a determination at the controller 11 that the vehicle 1000 has collided and/or impacted an external object, for example based on processing vehicle-related data received at the storage device 10), the controller 11 generates a third encryption key, which is a new encryption key, encrypts the data with the third encryption key, encrypts the third encryption key with the second encryption key, and stores the encrypted data and the encrypted third encryption key in the memory 12, so that the security level of the storage device 10 may be increased.

In addition, the controller 11 may be configured to generate a third encryption key after a certain time has elapsed. Specifically, the controller 11 may generate a new encryption key for encrypting data at a predetermined cycle, and encrypt the data with the generated new encryption key so that the security level of the storage device 10 may be increased.

The third encryption key may be, for example, a symmetric key, and the controller 11 may generate a symmetric key with a new encryption key for encrypting data and encrypt the data with a symmetric key, thereby increasing an encryption speed than when data is encrypted by a public key or the like.

Figure 6:
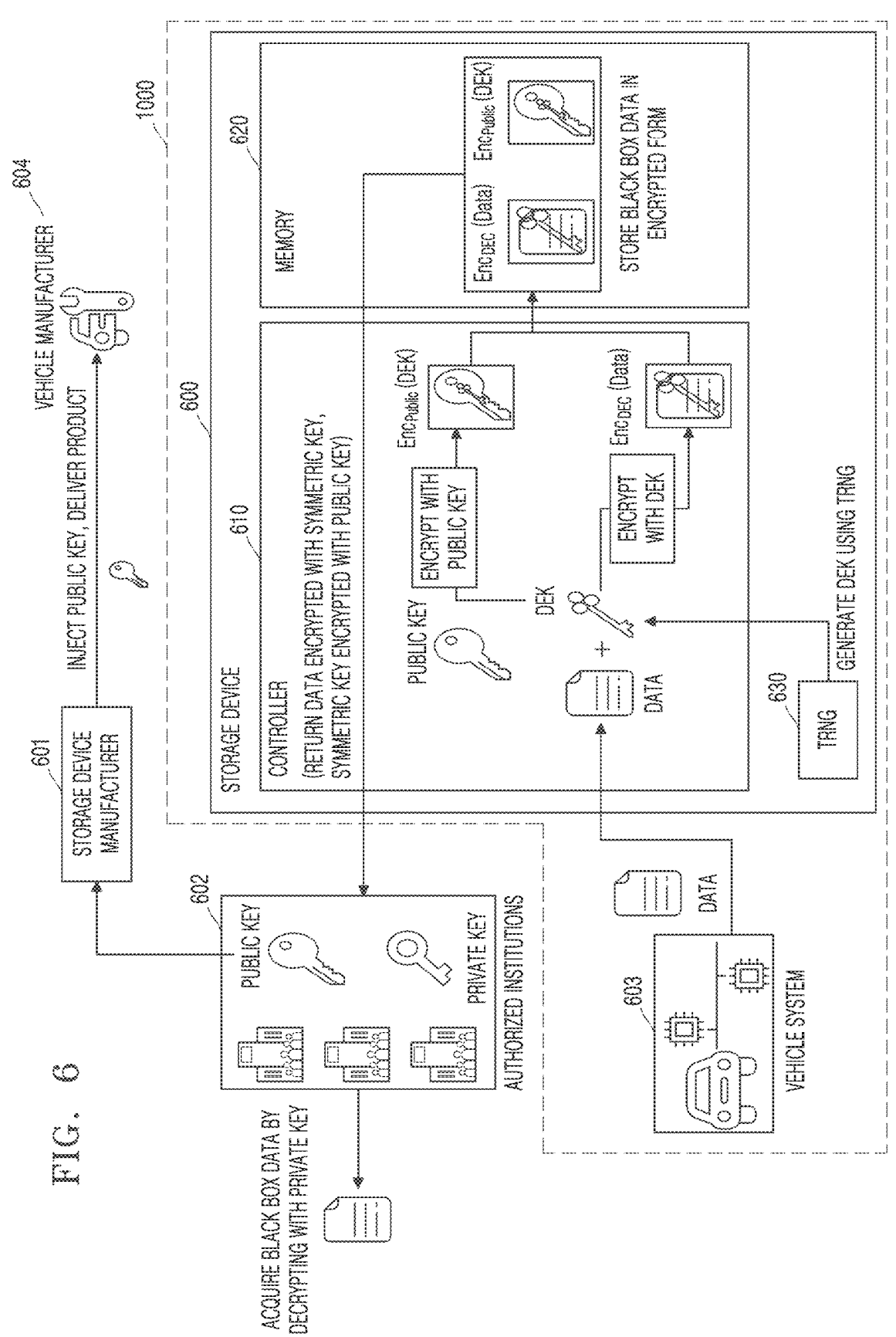
FIG. 6 is a view for describing a system according to some example embodiments.

FIG. 6 is a view for describing a system according to some example embodiments.

Referring to FIG. 6, during manufacturing of a memory 620, a storage device manufacturer 601 may inject (e.g., store, embed, etc.) a public key into the memory 620 and may deliver the memory 620 to a vehicle manufacturer 604. In this case, the public key may be a public key generated from authorized institutions 602. Thus, the authorized institutions 602 may have private keys. In some example embodiments, the authorized institutions may include a public key infrastructure (PKI).

The vehicle manufacturer 604 may generate (e.g., manufacture, build, etc.) a vehicle 1000 having the storage device 600 including the memory 620 described above. In the vehicle, the storage device 600 may be configured to store data related to the vehicle 1000. Specifically, as the black box data received from the vehicle system 603 (e.g., one or more devices, systems, etc. of the vehicle 1000), the controller 610 of the storage device 600 may receive data such as data indicating an angle of a handle steering device of the vehicle 1000, data indicating whether or not a brake of the vehicle 1000 is activated, data indicating whether or not an accelerator of the vehicle 1000 is activated, and data indicating the speed of the vehicle 1000.

The controller 610 may generate a symmetric key that is a Data Encryption Key (DEK) for encrypting the received data. At this time, the controller 610 may generate the Data Encryption Key (DEK) for encrypting data by using the TRNG 630, and the DEK may be a symmetric key.

The controller 610 may encrypt an encryption key for encrypting data by using the public key stored in the memory 620. For example, the controller 610 may encrypt the symmetric key with the public key.

The controller may store, in the memory 620, a symmetric key $Enc_{Public}$ (DEK) encrypted with the public key and data $Enc_{DEK}$ (Data) encrypted with the symmetric key.

For the same reason as that of a vehicle collision, when the inquiry of the black box data is required (e.g., in response to receiving a request for the black box data), the storage device 600 may transfer (e.g., transmit) the symmetric key $Enc_{Public}$ (DEK) encrypted with the public key and the data $Enc_{DEK}$ (Data) encrypted with the symmetric key to the authorized institutions 602 (e.g., an external device supporting the authorized institutions 602). In some example embodiments, the request for the black box data may be received from the authorized institutions 602. Since the authorized institutions 602 secure a private key associated with the public key, the authorized institutions 602 may decrypt the symmetric key $Enc_{Public}$ (DEK) using the private key, and may decrypt the data $Enc_{DEK}$ (Data) encrypted with the symmetric key (e.g., based on using the decrypted symmetric key) to acquire desired data, i.e., black box data. The security of the data may be improved, and thus the confidence in the accuracy of a determination of the operation of the vehicle as indicated by the decrypted data as being free from counterfeiting or modulation or tampering to obscure defects in the vehicle 1000, the storage device 600, or the like may be improved, based on the data being encrypted with the symmetric key that is itself encrypted with a public key, such that decryption of the encrypted data may include decrypting the encrypted symmetric key using a private key corresponding to the public key and then decrypting the encrypted data using the decrypted symmetric key. Additionally, the power consumption efficiency of the storage device 600 may be improved without compromising data security provided by the storage device 600, based on the controller 610 using the DEK (e.g., symmetric key) to implement quick encryption of the data and improving security of the quick encryption based on encrypting the DEK using a separate encryption key (e.g., a public key). Decryption of data and encryption key will be described in more detail below.

Figure 7:
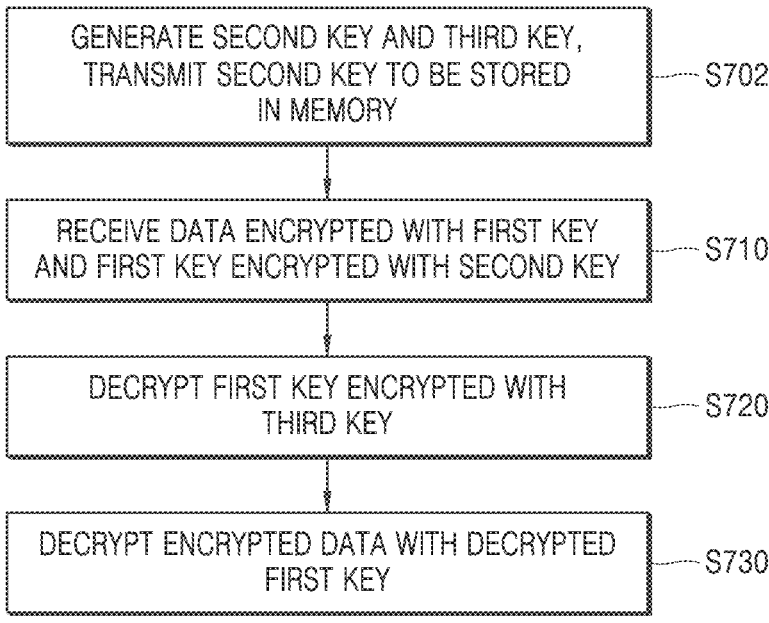
FIG. 7 is a flowchart illustrating a method according to some example embodiments.

FIG. 7 is a flowchart illustrating a method according to some example embodiments.

Referring to FIG. 7, in the method according to some example embodiments, in operation S710, authorized institutions may receive data encrypted with a first key and a first key encrypted with a second key. In this case, the authorized institutions may be reliable institutions and a place where the second key (e.g., public key) and the third key (e.g., private key corresponding to the public key) are generated (e.g., a public key infrastructure (PKI)), for example at operation S702. Specifically, for example as shown in operation S702, the authorized institutions may generate the second key and the third key and may store the second key in the memory during manufacturing of the memory and/or transmit the second key to an external device to enable the second key to be stored in the memory during manufacturing thereof (e.g., in operation S702 prior to receiving the encrypted data and encrypted first key at operation S710). The third key generated at operation S702 may be stored at the authorized institutions (e.g., at a computing device supporting the authorized institutions). Also, the authorized institutions may secure (e.g., store) the third key so as to decrypt the encrypted first key with the second key. For example, the first key may be a key for encrypting data and may be a symmetric key. Also, the second key may be a public key for encrypting the first key. Also, the third key may be a private key generated like a public key that is the second key (e.g., the third key may be a private key corresponding to the public key that is the second key).

In operation S720, the authorized institutions may decrypt the encrypted first key with the third key. In other words, in order to decrypt the encrypted data with the first key, the authorized institutions may decrypt the first key encrypted with the third key, thereby obtaining the first key. For example, the authorized institutions may receive the symmetric key encrypted with the public key, and may decrypt the symmetric key encrypted with the public key by using the private key, thereby obtaining the symmetric key.

In operation S730, the authorized institutions may decrypt the encrypted data with the decrypted first key. For example, the authorized institutions may obtain an unencrypted symmetric key by decrypting the symmetric key encrypted with the public key by using the private key as described above, and decrypt the encrypted data with the symmetric key by using the symmetric key. The authorized institutions may acquire the desired data by decrypting the encrypted data. The authorized institutions (e.g., an electronic device supporting same) may process the decrypted data to determine one or more operations indicated by the data (e.g., determine one or more operations by one or more portions of a vehicle at or near the time of a collision of the vehicle with an external object). The authorized institutions (e.g., an electronic device supporting same) may, based on processing the decrypted data, determine one or more sources of fault (e.g., one or more proximate causes) of a collision of the vehicle with the external object.

Figure 8:
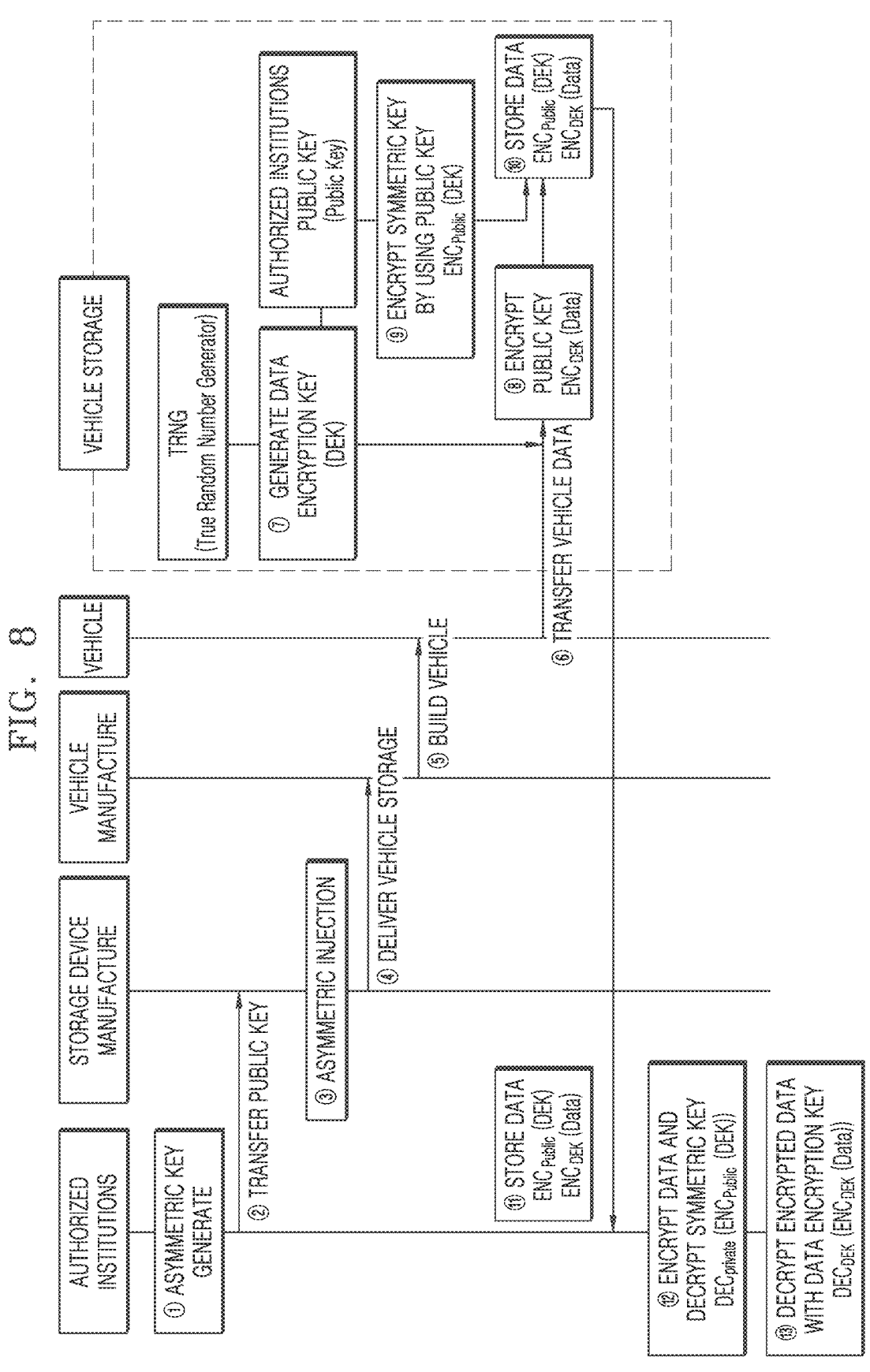
FIG. 8 is a view for describing a system according to some example embodiments.

FIG. 8 is a view for describing a system according to some example embodiments.

Referring to FIG. 8, reliable institutions (i.e., authorized institutions) may generate an asymmetric key, which may include a public key and a private key corresponding to the public key. In other words, authorized institutions may generate a public key and a private key ((①)).

Authorized institutions may transfer (e.g., transmit) the generated public key to the storage device manufacturer ((②)). The authorized institutions may retain (secure, store, etc.) the generated private key. The storage device manufacturer may store the received public key in the memory during manufacturing of the memory ((③)). Also, the storage device manufacturer may deliver the memory into which the public key is injected, and/or a storage device including same, to the vehicle manufacturer ((④)).

The vehicle manufacturer may manufacture (e.g., build) the vehicle by installing the storage device therein ((⑤)).

The vehicle may store vehicle data (e.g., black box data) obtained through driving or parking or the like in the vehicle storage device ((⑥)). Specifically, the vehicle storage device may receive vehicle data and may generate the symmetric key DEK using the TRNG ((⑦)) (e.g., in response to receiving the vehicle data). Also, the vehicle storage device may encrypt the received data (e.g., received vehicle data) with the symmetric key ((⑧)), and may encrypt the symmetric key with the public key previously stored during manufacturing of the memory ((⑨)). Also, the vehicle storage device may store the data $ENC_{DEK}$ (Data) encrypted with the symmetric key and the symmetric key $ENC_{Public}$ (DEK) encrypted with the public key ((⑩)) (e.g., stored as black box data).

When an inquiry for vehicle data is required for reasons such as a vehicle collision occurring (e.g., in response to a determination that the vehicle has collided with an external object), authorized institutions may request data from a storage device for a vehicle (e.g., the vehicle determined to have collided with the external object). Thus (e.g., in response to receiving such a request), the vehicle storage device of the vehicle may transfer (e.g., transmit) the data $ENC_{DEK}$ (Data) encrypted with the stored symmetric key and the symmetric key $ENC_{Public}$ (DEK) encrypted with the public key to authorized institutions ((⑪)) (from which the request may be received). The storage device manufacturer and/or the vehicle manufacturer may be excluded from being a recipient of the data $ENC_{DEK}$ (Data) encrypted with the stored symmetric key and the symmetric key $ENC_{Public}$ (DEK) encrypted with the public key, but in some example embodiments the data $ENC_{DEK}$ (Data) encrypted with the stored symmetric key and the symmetric key $ENC_{Public}$ (DEK) encrypted with the public key may be transferred to one or both of storage device manufacturer and/or the vehicle manufacturer in response to the storage device receiving a request to transfer the data $ENC_{DEK}$ (Data) encrypted with the stored symmetric key and the symmetric key $ENC_{Public}$ (DEK) encrypted with the public key.

Authorized institutions may decrypt the encrypted symmetric key with the public key by using the private key because it (e.g., the authorized institutions) secure the private key associated with the public key ((⑫)). Authorized institutions may decrypt the symmetric key $ENC_{Public}$ (DEK) encrypted with the public key by using the private key, thereby obtaining an unencrypted symmetric key, and may decrypt the data $ENC_{DEK}$ (Data) encrypted with the symmetric key based on using the unencrypted symmetric key, thereby acquiring desired data ((⑬)). The authorized institutions (e.g., an electronic device supporting same) may process the decrypted vehicle data (Data) to determine one or more operations of the vehicle as indicated by the vehicle data (e.g., determine one or more operations by one or more portions of the vehicle at or near the time of the collision of the vehicle with the external object). The authorized institutions (e.g., an electronic device supporting same) may, based on processing the decrypted data, determine one or more sources of fault (e.g., one or more proximate causes) of a collision of the vehicle with the external object (e.g., a driver of the vehicle, a hardware failure of a component or device of the vehicle, another separate vehicle, etc.).

In addition, authorized institutions may use the private key to decrypt the encrypted symmetric key with the public key in the process of decrypting the encrypted symmetric key with the public key by using the private key. For example, only when 80% or more of the trusted institutions have agreed to decrypt, the symmetric key encrypted with the public key may be decrypted using the private key, but example embodiments are not limited thereto.

FIG. 9 is a block diagram illustrating a system according to some example embodiments.

Referring to FIG. 9, an autonomous driving device 500, which may be included in a vehicle 1000, may include a sensor 510, a memory 520, a processor 530, random access memory (RAM) 540, a main processor 550, a driving unit 560, and a communication interface 570, and components of the autonomous driving device 500 may be connected to each other to communicate with each other via a bus 502. In this case, the memory 520 may correspond to a memory of the above-described example embodiments, and the processor 530 may correspond to a controller of the above-described example embodiments.

The autonomous driving device 500 may analyze data about surrounding environments of an autonomous host vehicle (e.g., vehicle 1000) based on a neural network in real time to perform situation determination and vehicle operation control or the like.

The sensor 510 may include a plurality of sensors for generating information about the surround environments of the autonomous driving device 500. For example, the sensor 510 may include a plurality of sensors for receiving an image signal related to the surrounding environment of the autonomous driving device 500 and outputting the received image signal as an image. The sensor 510 may include an image sensor 511 such as a Charge Coupled Device (CCD) or a Complementary Metal Oxide Semiconductor (CMOS), a depth camera 513, Light Detection And Ranging (LiDAR) sensor 515, a Radio Detecting And Ranging (Radar) sensor 517. In some example embodiments, the image sensor 511 may generate a front image of the autonomous driving device 500 to provide the front image to the processor 530.

The sensor 510 may include a plurality of sensors for generating driving information of the autonomous driving device 500. For example, the sensor 510 may include a speedometer 519 for measuring the driving speed of the autonomous driving device 500 and outputting the measured speed value, and an accelerometer 512 for measuring the driving acceleration of the autonomous driving device 500 and outputting the measured speed value. The present inventive concepts are not limited thereto, and the sensor 510 may include an ultrasonic sensor (not shown), an infrared ray sensor (not shown), or the like.

The memory 520 may be a storage place for storing data, and for example, may store various data generated in an operation execution procedure of the main processor 550 and the processor 530.

When the processor 530 receives an image from the image sensor 511, it is determined whether or not the high-speed performance of the image processing operation is required, based on the information on the host vehicle. If the high-speed performance is required, the processor 530 performs the image processing operation by using the image processing module having a small amount of data through-put, thereby enabling the host vehicle to be controlled at a fast reaction rate in a dangerous situation.

The main processor 550 may control the overall operation of the autonomous driving device 500. For example, the main processor 550 may execute programs stored in the RAM 540, thereby controlling the function of the processor 530. The RAM 540 may store programs, data, application or instructions temporarily.

The main processor 550 may control the operation of the autonomous driving device 500 based on the operation result of the processor 530.

The driving unit 560 may be a component for driving the autonomous driving device 500, and may include an engine/motor 561, a steering unit 563, and a brake unit 565. According to some example embodiments, the driving unit 560 may adjust propulsion, braking, speed, and direction of the autonomous driving device 500 by using the engine/motor 561, the steering unit 563, and the brake unit 565 under the control of the processor 530.

The communication interface 570 may perform communication with an external device by using a wired or wireless communication method. For example, the communication interface 570 may perform communication in a wired communication method such as Ethernet, or perform communication in a wireless communication method such as Wi-Fi or Bluetooth.

As described herein, any devices, systems, units, blocks, circuits, controllers, processors, and/or portions thereof according to any of the example embodiments (including, for example, the storage device 10, the controller 11, the memory 12, the TRNG 13, the storage device 600, the storage device manufacturer 601, the authorized institutions 602, the vehicle system 603, the controller 610, the memory 620, the TRNG 630, the autonomous driving device 500, the sensor 510, the image sensor 511, the depth camera 513, the LiDAR sensor 515, the Radar sensor 517, the memory 520, the processor 530, the random access memory (RAM) 540, the main processor 550, the driving unit 560, the engine/motor 561, the steering unit 563, the brake unit 565, the communication interface 570, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid-state drive memory device, storing a program of instructions, and a processor (e.g., CPU) configured to execute the program of instructions to implement the functionality and/or methods performed by some or all of any devices, systems, units, blocks, circuits, controllers, processors, and/or portions thereof according to any of the example embodiments.

While the inventive concepts have been particularly shown and described with reference to some example embodiments thereof, it will be understood that various changes in form and details may be made therein without departing from the spirit and scope of the following claims.

What is claimed is:

1. A vehicle storage device, comprising:
   a controller configured to:
      receive vehicle-related data comprising at least one of an angle of a handle steering device of a vehicle, an indication of whether or not an accelerator of the vehicle is activated or an indication of whether or not a brake of the vehicle is activated; and
      responsive to receiving the vehicle-related data, generate, using a True Random Number Generator (TRNG), a first encryption key, wherein the generated first encryption key is a symmetric key; and
   a memory storing a second encryption key issued from an authorized institution, wherein the second encryption key is a public key having a corresponding private key,
   wherein the controller is further configured to:
      encrypt the vehicle-related data with the generated first encryption key,
      encrypt the first encryption key with the second encryption key,
      store the encrypted vehicle-related data and the encrypted first encryption key in the memory,
      store a matching table in the memory, the matching table including a logic page number indicating a location in the memory where the encrypted vehicle-related data and the encryption key are stored;
      receive a request from an external device to access the vehicle-related data, the external device having the corresponding private key to the second encryption key; and
      responsive to receiving the request from the external device to access the vehicle-related data, transmit the stored encrypted vehicle-related data and the stored encrypted first encryption key to the external device such that the external device decrypts the encrypted first encryption key using the corresponding private key to the second encryption key and decrypts the encrypted vehicle-related data using the unencrypted first encryption key.

2. The vehicle storage device of claim 1, wherein the second encryption key is stored at the memory prior to the receiving the vehicle-related data and the generating the first encryption key.

3. The vehicle storage device of claim 1, further comprising the True Random Number Generator (TRNG), for generating the first encryption key.

4. The vehicle storage device of claim 1, wherein the controller is further configured to store, in the memory, information indicating that the encrypted vehicle-related data and the encrypted first encryption key are associated with each other.

5. The vehicle storage device of claim 1, wherein the first encryption key is generated as an unencrypted first encryption key, and the controller is further configured to delete the unencrypted first encryption key in response to a determination that the encrypted vehicle-related data and the encrypted first encryption key are stored in the memory.

6. The vehicle storage device of claim 1, wherein the first encryption key is generated as an unencrypted first encryption key, and the controller is further configured to delete the unencrypted first encryption key in response to a determination that a supply of power received at the vehicle storage device is turned off.

7. The vehicle storage device of claim 1, wherein the controller is further configured to generate a third encryption key, encrypt the vehicle-related data with the third encryption key, and encrypt the third encryption key with the second encryption key, in response to a determination that a certain time has elapsed.

8. The vehicle storage device of claim 1, wherein the controller is further configured to generate a third encryption key, encrypt the vehicle-related data with the third encryption key and encrypt the third encryption key with the second encryption key, in response to a determination that an electronic device including the vehicle storage device has impacted an external object.

9. The vehicle storage device of claim 1, wherein the controller is further configured to not delete the vehicle-related data stored in the memory in response to receiving instructions to delete the vehicle-related data stored in the memory.

10. A method, comprising:
    receiving vehicle data comprising at least one of an angle of a handle steering device of a vehicle, an indication of whether or not an accelerator of the vehicle is activated, or an indication of whether or not a brake of the vehicle is activated;
    responsive to receiving the vehicle-related data, generating, using a True Random Number Generator (TRNG), a first encryption key, wherein the first encryption key is a symmetric key;
    encrypting the vehicle data with the first encryption key;
    encrypting the first encryption key with a second encryption key, wherein the second encryption key is a public key having a corresponding private key;
    storing the encrypted vehicle data and the encrypted first encryption key in a memory;
    storing a matching table in the memory, the matching table including a logic page number indicating a location in the memory where the encrypted vehicle data and the encrypted first encryption key are stored;
    receiving a request from an external device to access the vehicle-related data, the external device having the corresponding private key to the second encryption key; and responsive to receiving the request from the external device to access the vehicle-related data, transmit the stored encrypted vehicle-related data and the stored encrypted first encryption key to the external device such that the external device decrypts the encrypted first encryption key using the corresponding private key to the second encryption key and decrypts the encrypted vehicle-related data using the unencrypted first encryption key.

11. The method of claim 10, wherein the second encryption key is stored in the memory prior to the receiving vehicle data and the generating the first encryption key.

12. The method of claim 10, further comprising storing, in the memory, information indicating that the encrypted vehicle data and the encrypted first encryption key are associated with each other.

13. A method of encrypting and decrypting vehicle data, the method comprising:
    receiving the vehicle data;
    responsive to receiving the vehicle data, generating, using a True Random Number Generator (TRNG), a first encryption key, wherein the generated first encryption key is a symmetric key;
    encrypting the vehicle data comprising at least one of an angle of a handle steering device of a vehicle, an indication of whether or not an accelerator of the vehicle is activated or an indication of whether or not a brake of the vehicle is activated, based on the first encryption key;
    encrypting the first key, based on a second key, wherein the second key is a public key having a corresponding private key;
    decrypting the encrypted first key, based on a third key associated with the second key, the third key being the corresponding private key;
    decrypting the encrypted vehicle data, based on the decrypted first encryption key;
    storing a matching table in a memory, the matching table including a logic page number indicating a location in the memory where the encrypted vehicle data and the encrypted first encryption key are stored;
    receiving a request from an external device to access the vehicle data, the external device having the third encryption key; and
    responsive to receiving the request from the external device to access the vehicle data, transmitting the stored encrypted vehicle data and the stored encrypted first encryption key to the external device.

* * * * *